United States Patent
Peng et al.

(10) Patent No.: US 8,478,002 B2
(45) Date of Patent: Jul. 2, 2013

(54) METHOD FOR ANALYZING OBJECT MOTION IN MULTI FRAMES

(75) Inventors: Shih-Yuan Peng, New Taipei (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 91 days.

(21) Appl. No.: 13/217,271

(22) Filed: Aug. 25, 2011

(65) Prior Publication Data
US 2012/0250945 A1 Oct. 4, 2012

(30) Foreign Application Priority Data
Apr. 1, 2011 (TW) .............................. 100111555 A

(51) Int. Cl.
*G06K 9/00* (2006.01)

(52) U.S. Cl.
USPC ........................................................ 382/107

(58) Field of Classification Search
USPC ................................................ 382/100, 107
See application file for complete search history.

(56) References Cited

U.S. PATENT DOCUMENTS

| | | | |
|---|---|---|---|
| 6,985,172 B1 * | 1/2006 | Rigney et al. ................. | 348/149 |
| 7,899,208 B2 * | 3/2011 | Kondo et al. ................. | 382/103 |
| 2008/0037829 A1 * | 2/2008 | Givon ........................... | 382/107 |

* cited by examiner

*Primary Examiner* — Shefali Goradia
(74) *Attorney, Agent, or Firm* — Jianq Chyun IP Office

(57) ABSTRACT

A method for analyzing object motion in multi frames adapted to an image capturing device is provided. Firstly, a plurality set of first sum of absolute difference (SAD) are obtained according to noise of the image capturing device under a plurality of light settings. Next, two frames are captured under a picturing light setting of the light settings. Then, a plurality of second SAD between the two frames are calculated. Afterwards, a plurality of object block within vein tracking of the object are found. Next, a local motion vector of each object block is respectively calculated according to the second SAD. Then, a first reliability of each object block is respectively calculated according to the second SAD and the set of the first SAD corresponding to the picturing light setting. Afterwards, the local motion vectors are estimated according to the first reliability to obtain a global motion vector.

9 Claims, 6 Drawing Sheets

METHOD FOR ANALYZING OBJECT MOTION IN MULTI FRAMES

CROSS-REFERENCE TO RELATED APPLICATION

This application claims the priority benefit of Taiwan application serial no. 100111555, filed on Apr. 1, 2011. The entirety of the above-mentioned patent application is hereby incorporated by reference herein and made a part of this specification.

BACKGROUND OF THE INVENTION

1. Field of the Invention

This invention is related to an image processing method, more particular to a method for analyzing object motion in multi-frames.

2. Description of Related Art

There are many reasons to generate noises in an image, such as the signal amplifier, inducing waste heat, interaction between lens and photo sensor, interfering with one another during transmission process. Each photo sensor configured to different lenses may cause different effect. In nowadays image processing application, blending and analyzing of multi-frame is widely discussed and used, but how to accurately analyze the motion relations between different frames is the big problem. Taking the 3D noise reduction as an example, once a wrong analysis result of the motion between different frames is used, cross-talk may often occur in the blended image. There are plenty of methods of analyzing object motion in multi-frame, but the analyzing speed like. A comparatively simple and effective way is the method of sum of absolute difference (SAD).

However, in a seriously noisy environment, it is easy to obtain a wrong analyzing result if the method of SAD is merely relied on. In addition, the consideration of taking the resulting absolute difference and the smallest block as the optimum approximate location where the block exists is rather unsuitable. Since in a seriously noisy environment, the value of the absolute difference is not small in reality. For example, when the difference between the maximum SAD and the minimum SAD is quite small in searched region, it is easy to cause error if the coordinates of the smallest value is identified as the corresponding coordinates. Moreover, it can indeed reduce the effect of noise if the likelihood function is used as a fundamental to analyze the object motion. However, it needs a very large calculation resource. Especially for the products using the complementary metal-oxide-semiconductor sensor (CMOS sensor) at high frame rate, a much higher calculation speed and efficiency is necessary. Such tedious and time consuming algorithm is difficult to be realized in a product for image processing.

SUMMARY OF THE INVENTION

The present invention provides a method for analyzing object motion in multi-frame which is able to avoid the effect of the object motion analysis due to noise.

The present invention provides a method for analyzing object motion in multi-frames adapted to an image capturing device, including the following steps. First, a plurality set of first sum of absolute difference is obtained according to noise of the image capturing device under a plurality of light settings. Each of the light settings respectively corresponds to a set of first sum of absolute difference. Then, a first frame and a second frame are captured via the image capturing device under a picturing light setting of the light settings. And then, a plurality of second sum of absolute difference between the first frame and the second frame is calculated. After that, a plurality of object blocks within a vein tracking of the object in the first frame and the second frame is found. And then, a local motion vector of each object block is respectively calculated according to the second sum of absolute difference. After that, a first reliability of each object block is respectively calculated according to the second sum of absolute difference and the set of first sum of absolute difference corresponding to the picturing light setting. Finally, the local motion vectors are estimated according to the first reliability to obtain a global motion vector.

In one embodiment of the present invention, the steps of obtaining the sets of first sum of absolute difference according to the noise of the image capturing device under the light settings include the followings. First, a plurality of images are captured to a light box via the image capturing device under the light settings respectively. Then, the first sum of absolute difference of the images in different locations is calculated and recorded.

In one embodiment of the present invention, the step of calculating and recording the first sum of absolute difference of the images in different locations include the following. The first sum of absolute difference of four corner pixels of each block of the images is recorded so as to interpolate the first sum of absolute difference of pixels of each block via the first sum of absolute difference of the four corner pixels.

In one embodiment of the present invention, the step of calculating and recording the first sum of absolute difference of the images in different locations include the following. The first sum of absolute difference shared by the pixels in each block of the images is recorded.

In one embodiment of the present invention, the light source settings includes at least one of brightness of the light box, color and photo sensitivity of the image capturing device and limb darkening.

In one embodiment of the present invention, finding the object blocks includes the following steps. First, a maximum sum of absolute difference and a minimum sum of absolute difference of each block between the first frame and the second frame is calculated. And then, whether each block is among one of the object blocks or a background block is determined according to the difference between the maximum sum of absolute difference and the minimum sum of absolute difference of each block.

In one embodiment of the present invention, estimating the local motion vectors according to the first reliability to obtain a global motion vector includes the following steps. First, a second reliability of the object blocks is respectively calculated according to the difference between the maximum sum of absolute difference and the minimum sum of absolute difference of each block. Then, the local motion vectors are estimated according to the first reliability and the second reliability to obtain the global motion vector.

In one embodiment of the present invention, estimating the local motion vectors according to the first reliability to obtain the global motion vector includes the following steps. First, a plurality of average reliabilities are calculated according to the first reliability and the second reliability. Then, the local motion vectors are weighted according to the average reliability to obtain the global motion vector.

In one embodiment of the present invention, calculating the first reliability according to the second sum of absolute difference and the set of first sum of absolute difference corresponding to the picturing light setting includes the following steps. First, a standard deviation tolerance of the set of first sum of absolute difference is calculated. Then, a ratio of the second sum of absolute difference to the set of first sum of absolute difference is calculated. After that, the ratio and the standard deviation tolerance are compared to obtain the first reliability.

In light of the foregoing, the present invention uses the cooperation of a first sum of absolute difference which is earlier obtained and a second sum of absolute difference calculated by two frames in different locations to estimate a global motion vector. And the global motion vector can be accurately estimated in the present invention.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
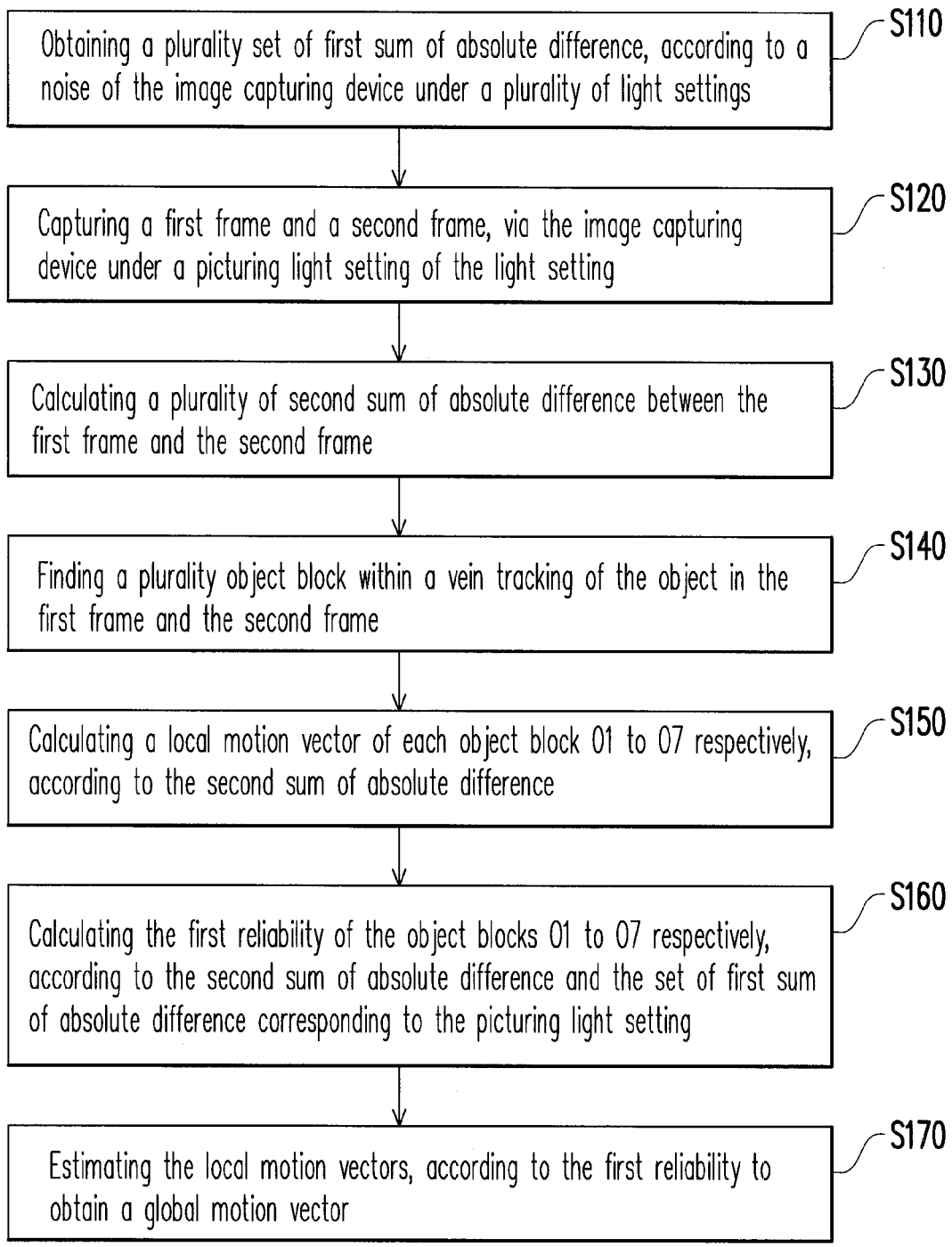
FIG. 1 is a flow diagram illustrating a method for analyzing object motion in multi frames according to the first embodiment of the present invention.

FIG. 1 is a flow diagram illustrating a method for analyzing object motion in multi frames according to the first embodiment of the present invention. In the embodiment, the flow diagram of FIG. 1 is adapted to image capturing device (not shown) such as digital camera, digital video camera. Please refer to FIG. 1. First, step S110 is performed: a plurality set of first sum of absolute difference is obtained according to a noise of the image capturing device under a plurality of light settings. Each of the light settings respectively corresponds to a set of first sum of absolute difference. For instance, different brightness light box can be firstly pre-captured by the image capturing device. After calculating the light box image in different locations, then a first sum of absolute difference (SAD) caused by the simplest noise under different brightness can be obtained.

Specifically, the light box capturing can be done from the low brightness LV2 to high brightness LV14, and the first SAD of the light box image corresponding to various levels of brightness can be calculated. Only recording the first SAD of some levels of brightness can be done to save the memory. For example, the first SAD of LV2, LV5 and LV10 are merely recorded while the first SAD of LV3, LV4 and the like can be calculated by interpolation. Except the brightness, the condition under different photo sensitivities of the image capturing device can be recorded, for example, from capturing with photo sensitivity of 100 to 3200. In another embodiment, image can be captured with color chart by image capturing device so as to pre-detect the effect of color noise under different color areas.

In addition, in another embodiment, the effect of lens color shading can be considered. Theoretically, the noise caused by the lens color shading can be comparatively serious. One condition is taken as an example. Under the condition of photo sensitivity 800, light box brightness LV10, images are captured to the light box in different locations and a first SAD is calculated and recorded. Since the color shading is comparatively serious at corners, the first SAD is supposed to be larger. The higher the photo sensitivity, the value of first SAD is larger. Each of the light box images can be divided into a plurality of blocks for the convenience of storing, and the first SAD calculated in the block centre is recorded. Since the effect of noise may cause the first SAD to have a tolerable range, a calibration data can be obtained through the average value and standard deviation calculated by the recorded result from plurality of experiments. For example, comparing to the photo sensitivity 800, the standard deviation of first SAD of the photo sensitivity 3200 may be larger.

It is worthy to note that, by the above mentioned method, the feature of noise of the photo sensor of the image capturing device can be previously obtained and recorded. Furthermore, deviation calculated at every time may exist even the first SAD value is calculated from the same block. And thus, the variation of first SAD can be recorded at the same time while the variation data is recorded. Additionally, the analyzed image is obtained from capturing the monotonic background. Thus, the effect of random noise can be independently analyzed.

Figure 2:
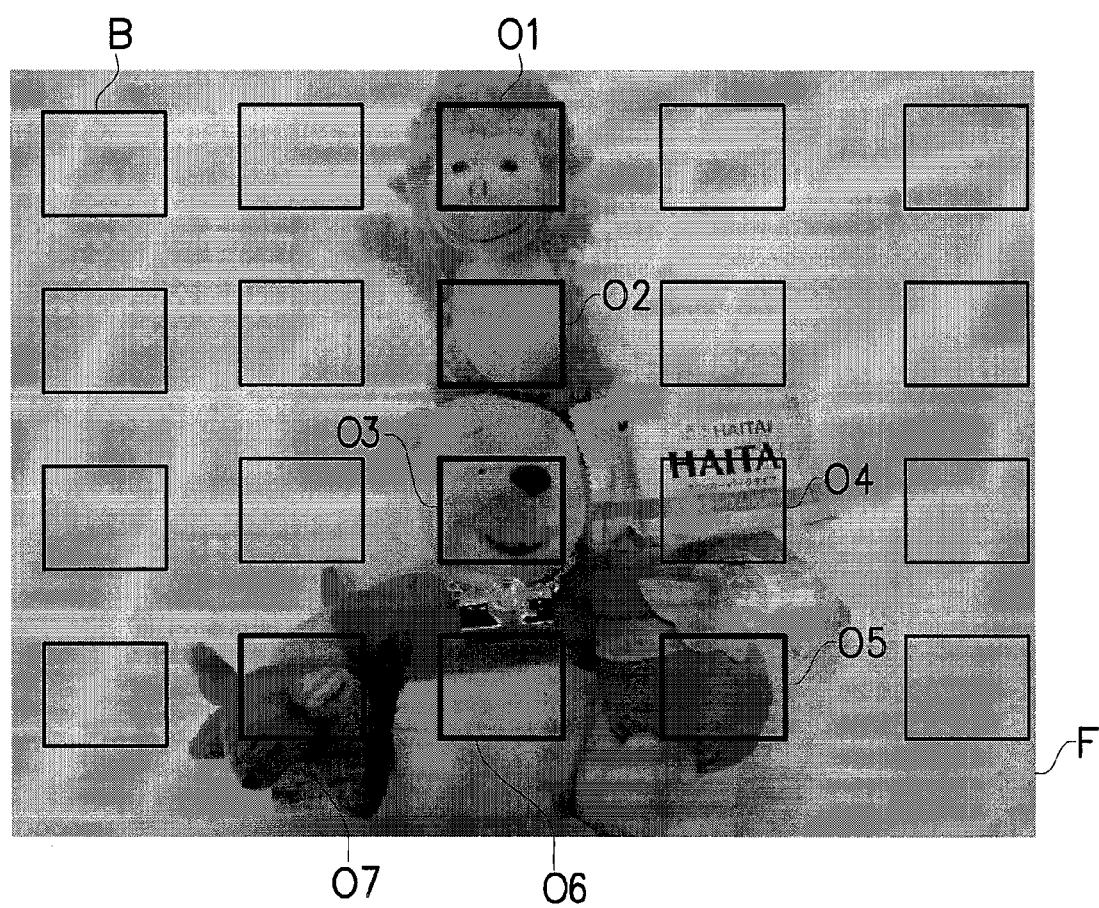
FIG. 2 illustrates the frame captured by the image capturing device.

Then, the step S120 is performed: a first frame and a second frame are captured via the image capturing device under a picturing light setting of the light settings. And then, the step S130 is performed: a plurality of second sum of absolute difference between the first frame and the second frame is calculated. FIG. 2 illustrates the frame captured by the image capturing device. Referring to FIG. 2, after two continuous frames F are captured, the frame F can be divided into a plurality of blocks B. Then, the second SAD of these blocks B is respectively calculated.

After that, the step S140 is performed: a plurality object block within a vein tracking of the object in the first frame and the second frame is found. Taking FIG. 2 as an example, object blocks O1 to O7 can be found from the overall blocks B of the frame F. And then, the step S150 is performed: a local motion vector of each object block O1 to O7 is respectively calculated according to the second SAD. In the embodiment, excluding the object blocks O1 to O7 of the frame F, the block B are planar regions, and these planar regions are easy to be interfered by noise. Thus, the planar regions are not considered in this embodiment to avoid the interfering of planar regions. Or the weighting of object blocks O1 to O7 can be increased and the noise of the planar region can be decreased.

Then, the step S160 is performed: the first reliability of the object blocks O1 to O7 is respectively calculated according to the second SAD and the first SAD corresponding to the picturing light setting. For example, picturing light settings can be obtained according to the picturing parameters set by users and the result of brightness analysis (such as camera's auto exposure (AE) algorithm), and the result of color analysis (such as auto white balancing (AWB) algorithm) The result of brightness analysis LV10, the photo sensitivity 800 and the neutral color of the picturing block are assumed, and then users can enter the system memory for the calibration of these parameters and the calibrated first SAD can be obtained. After the corresponding first SAD is taken out, the ratio of second SAD to first SAD can be calculated to obtain the first reliability.

Figure 3:
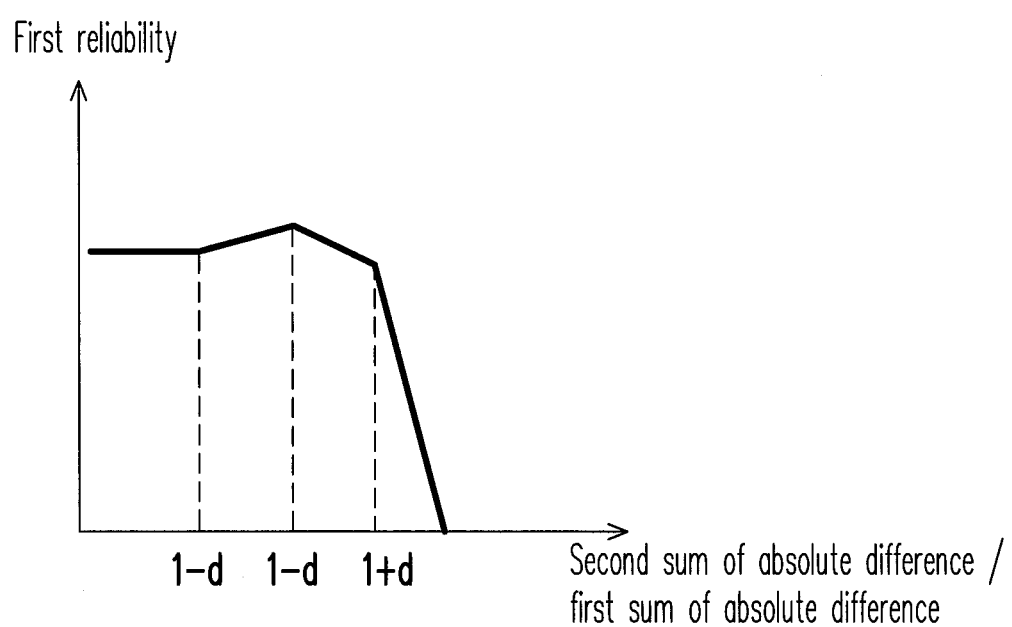
FIG. 3 illustrates the profiles of the first reliability corresponding to the ratio of the second sum of absolute difference to the first sum of absolute difference of FIG. 1.

FIG. 3 illustrates the profiles of the first reliability corresponding to the ratio of the second sum of absolute difference to the first sum of absolute difference of FIG. 1. Please refer to FIG. 3. When the ratio of second SAD to first SAD approximates to 1, it means that the result of calculation of second SAD rather approximates to the previously calibrated first SAD. That is, the block approximate to 1 is merely affected by random noise. In addition, since the noise signal may have a definite variance a standard tolerance d can be defined. All the ratios in the range of 1−d to 1+d may be the result of the random noise effect. In more detail, since in the random distribution theory most of the sampling may be close to where the ratio approximates to 1, and reliability here may be the highest. Thus, the tolerance d can be set according to the variation of first SAD recorded in step S110. Under the condition of low photo sensitivity, the value of d is smaller; under the condition of high photo sensitivity, the value of d is larger. In addition, in actual application, first, the profile of FIG. 3 can be dealt with smoothing, but not limited to.

Then, the step S170 is performed: the local motion vectors are estimated according to the first reliability to obtain a global motion vector. For example, the weighting of the local motion vector where the first reliability is high has to be raised, while the local motion vector where the first reliability is too low has to be excluded. Thus, an accurate result of global motion vector can be obtained.

In the embodiment, a method to increase the reliability of SAD and global motion analysis is provided so that the reliability can be adjusted and analyzed under different picturing settings. Taking the three dimensional noise reduction as an example, when the analysis reliability is high, the weighting of the temporal filtering can just be raised, otherwise, the weighting of the temporal filtering has to be lowered so as to approximate the value to spatial filtering. Cross-talk due to the wrong motion analysis is not only avoided, the quality of processed image can also be improved.

Figure 4:
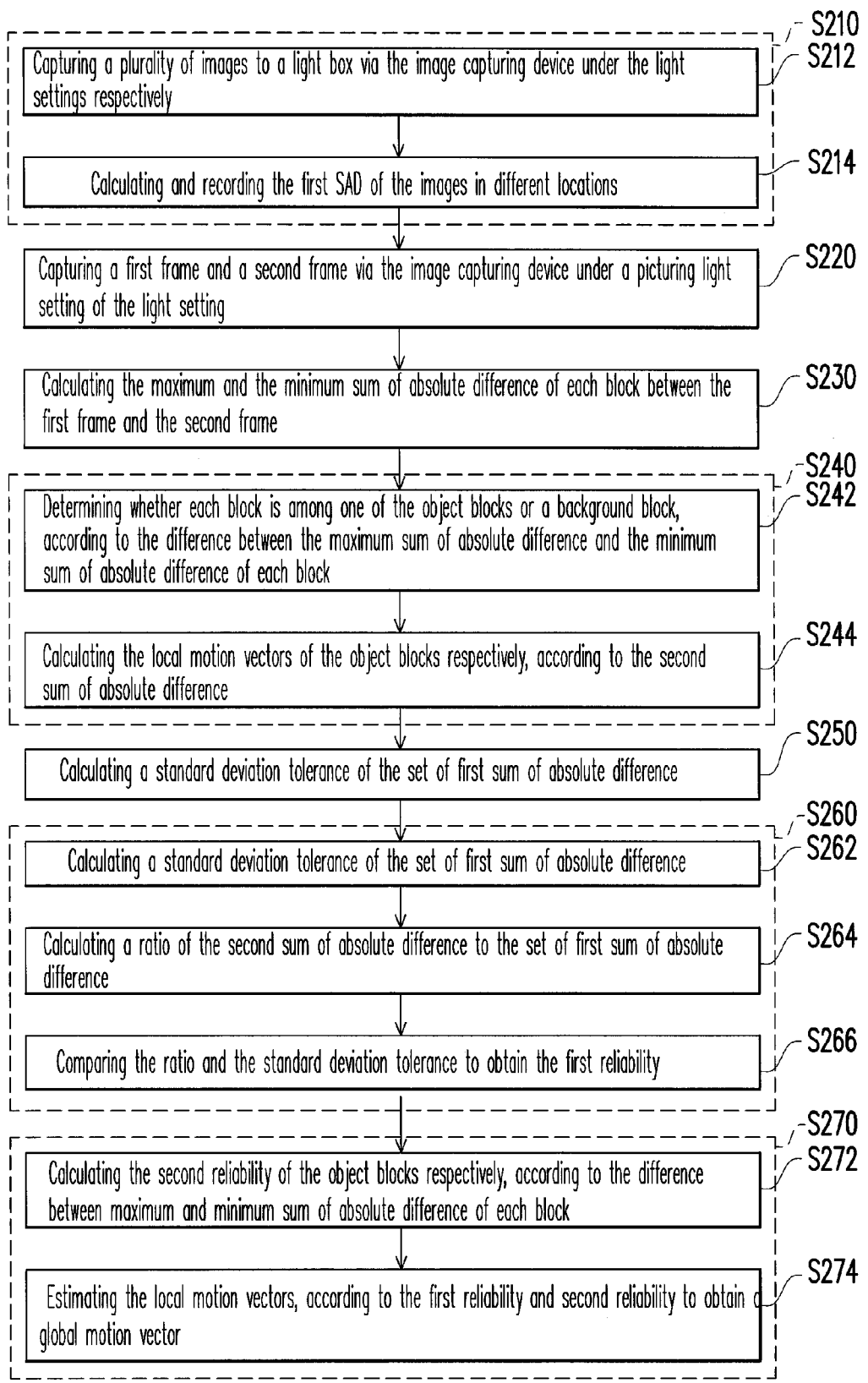
FIG. 4 is a flow diagram illustrating a method for analyzing object motion in multi frames according to the first embodiment of the present invention.

FIG. 4 is a flow diagram illustrating a method for analyzing object motion in multi frames according to the first embodiment of the present invention. Referring to FIG. 1 and FIG. 4, the present embodiment is similar to previous embodiment, and the similarity is not described again. The difference can also be used. The present invention is not limited to this. First, the step S210 is performed: a plurality set of first SAD is obtained according to a noise of the image capturing device under a plurality of light settings. In the present embodiment, step S210 includes steps S212 and S214. First, the step S212 is performed: a plurality of images are captured to a light box via the image capturing device under the light settings respectively. In the embodiment, the light source settings includes at least one of brightness of the light box, color and photo sensitivity of the image capturing device and limb darkening.

Figure 5A:
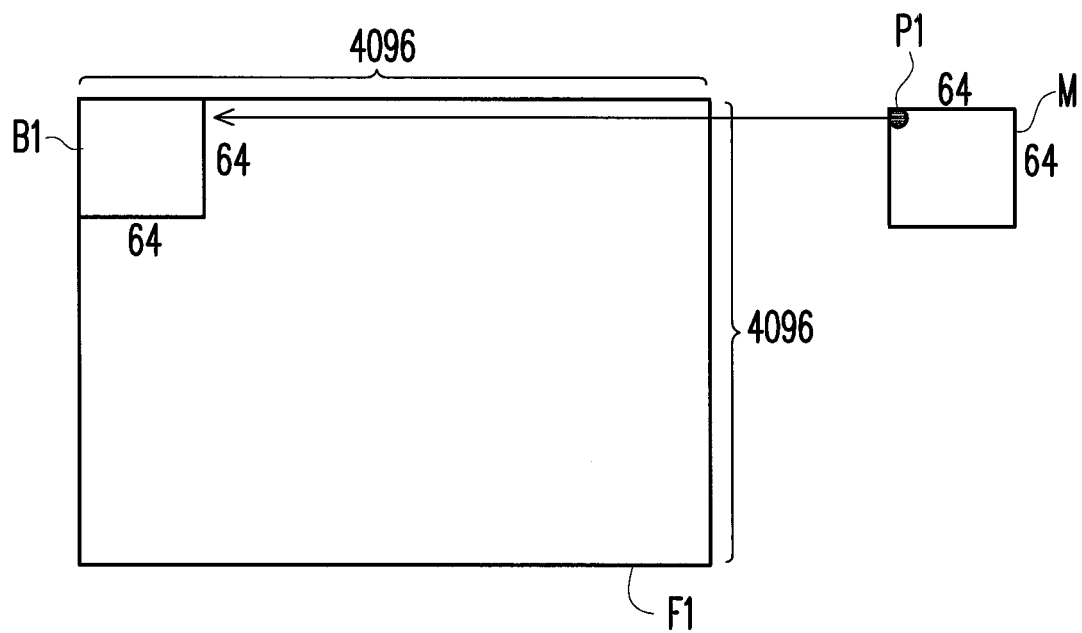
FIGS. 5A and 5B respectively illustrates the frame of two sorts of recording the first sum of absolute difference.
Figure 5B:
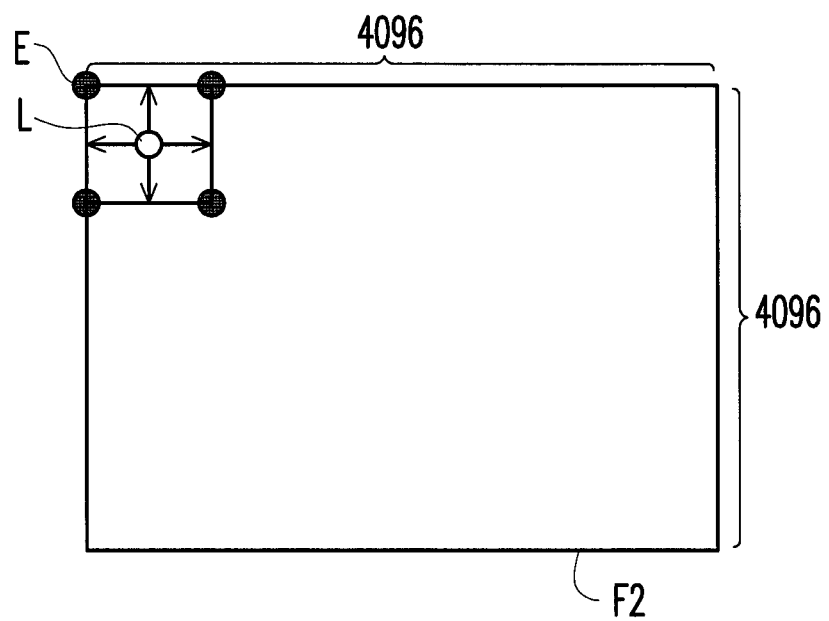

Then, the step S214 is performed: the first SAD of the images in different locations is calculated and recorded. FIGS. 5A and 5B respectively illustrates the frame of two sorts of recording the first sum of absolute difference. Please refer to FIGS. 5A and 5B, the following two methods can be used to simplify the recording of first SAD to save the system memory:

Please refer to FIG. 5A first, if data of first SAD of only 64×64 is stored in the memory M, the size of the actual image F1 is 4096×4096. At this moment, the size of the corresponding block B1 of the actual image F is: 4096/64=64 in length; 4096/64=64 in height. In other words, the 64×64 pixels in the block B1 are shared with the first SAD of the corresponding location P1 in the memory M.

Please refer to FIG. 5B, bilinear interpolation can also be used to obtain each value of first SAD. For example, the first SAD of four corner pixels E of each block can be firstly recorded for the whole image F2. When the corresponding first SAD of each of the pixels L within the block has to be calculated, bilinear interpolation algorithm can be used. For instance, if the size of image is 4096×4096, then 65×65 point of corner pixels E can be taken out, and then the size of each block is 64×64. Therefore, the first SAD of pixels L within each block can be interpolated via the first SAD of four corner pixels E.

Then, the step S220 is performed: a first frame and a second frame are captured via the image capturing device under a picturing light setting of the light settings. Then, the step S230 is performed: the plurality of second SAD between the first frame and the second frame is calculated.

Figure 6:
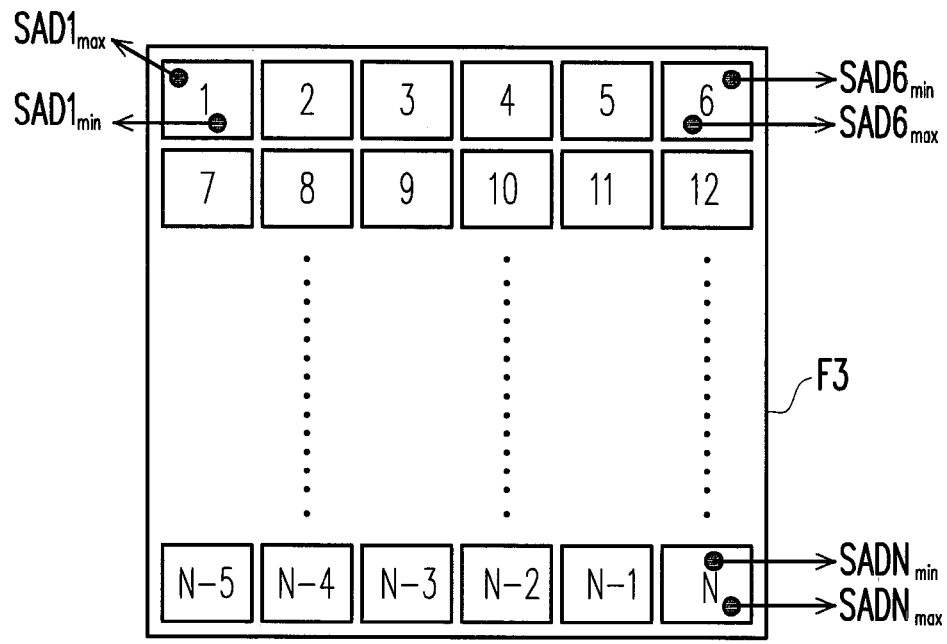
FIG. 6 illustrates the frame of maximum sum of absolute difference and the minimum sum of absolute difference.

And then, the step S240 is performed: the plurality object block within a vein tracking of the object in the first frame and the second frame is found. In the present embodiment, step S240 includes steps S242 and S244. Then, the step S242 is performed: the maximum and the minimum SAD of each block between the first frame and the second frame are calculated. In more detail, FIG. 6 illustrates the frame of maximum sum of absolute difference and the minimum sum of absolute difference. Please refer to FIG. 6. If it is assumed that there are blocks N within the image F3, then a corresponding maximum sum of absolute difference $SAD_{max}$ and minimum sum of absolute difference $SAD_{min}$ within each block can be calculated.

Then, the step S244 is performed: whether each block is among one of the object blocks or a background block is determined according to the difference between the maximum sum of absolute difference and the minimum sum of absolute difference of each block. In general, the greater the value of $SAD_{max}-SAD_{min}$, object profile or object edge may have passed through this region, and the smaller the value of $SAD_{max}-SAD_{min}$, variation of this region is not significant as a planar region or there is no any motion in this region. Thus, threshold value may be pre-set in this embodiment. When the value of $SAD_{max}-SAD_{min}$ is greater than the threshold value, the block is determined as an object block. When the value of $SAD_{max}-SAD_{min}$ is smaller than the threshold value, the block is determined as a background block.

Then, the step S250 is performed: the local motion vectors of the object blocks are respectively calculated according to the second SAD. Then, the step S260 is performed: the first reliability of the object blocks is respectively calculated according to the second SAD and the first SAD corresponding to the picturing light setting. In the present embodiment, step S260 includes steps S262 to S266. First, the step S262 is performed: a standard deviation tolerance of the set of first SAD is calculated. Then, the step S264 is performed: a ratio of the second SAD to the first SAD is calculated. And then, the step S266 is performed: the ratio and the standard deviation tolerance are compared to obtain the first reliability.

Figure 7:
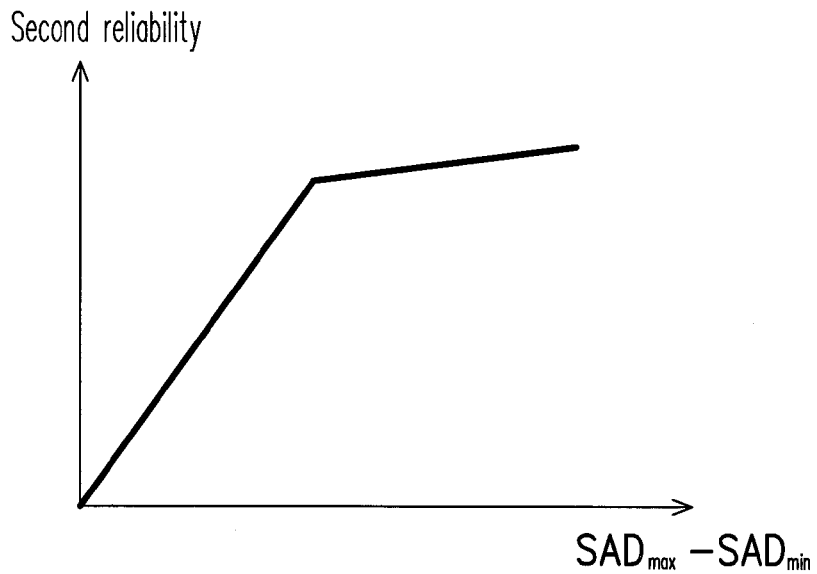
FIG. 7 illustrates the frame of correlations between the second reliability and the maximum and minimum sum of absolute difference.

Then, the step S270 is performed: the local motion vectors are estimated according to the first reliability to obtain a global motion vector. In the present embodiment, step S270 includes steps S272 and S274. Then, the step S272 is performed: the second reliability of the object blocks is respectively calculated according to the difference between $SAD_{max}$ and $SAD_{min}$ within each block of image F3. FIG. 7 illustrates the frame of correlations between the second reliability and the maximum and minimum sum of absolute difference. Please refer to FIG. 7, as the greater the value of $SAD_{max}-$ $SAD_{min}$, object profile or object edge may have passed through this region, there may be reliable information if this block is used to analyze motion. Thus, the second reliability of this block can be increased; on the contrary, the smaller the value of $SAD_{max}-SAD_{min}$ means variation of this region is not significant as a planar region or there is no any motion in this region. Therefore, the reliable information may not be obtained if this block is used to analyze motion and the second reliability of this block is decreased. It means, the second reliability increases if $SAD_{max}-SAD_{min}$ is greater than the threshold value (the critical point in FIG. 7), and the second reliability decreases if $SAD_{max}-SAD_{min}$ is smaller than the threshold value. In addition, in actual application, first, the profile of FIG. 7 can be dealt with smoothing, but not limited to.

Then, the step S274 is performed: the local motion vectors are estimated according to the first reliability and second reliability to obtain a global motion vector. In more detail, the average reliabilities can be calculated according to the first reliability and the second reliability. Then, the local motion vectors are weighted according to the average reliability to obtain the global motion vector. It is worthy to note that, the weighting of the local motion vector where the average reliability is high has to be raised, while the local motion vector where the average reliability is too low has to be excluded. Thus, an accurate result of global motion vector can be obtained.

In summary, the present invention uses the cooperation of a first sum of absolute difference which is earlier obtained and a second sum of absolute difference calculated by two frames in different locations to estimate a global motion vector. And the global motion vector can be accurately estimated in the present invention. Additionally, the necessary of cost and requirement of hardware is lowered because of the SAD. Thus, the present invention effectively reduces the necessary cost of hardware. Furthermore, the present invention has high flexibility. The analysis method of block-wise or pixel-wise algorithm can vary according to the size of memory, the quantity and time of calculation. Moreover, cross-talk occurrence can be avoided under the condition of multi-frames blending. Thus, the unacceptable disadvantages can be avoided. Furthermore, since the accuracy of motion analysis of blending is increased, the optimum quality of noise reduction in the planar region can be obtained and the most accurate details and object profile can also be maintained at the edges.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for analyzing object motion in multi frames adapted to an image capturing device, comprising:
   obtaining a plurality set of first sum of absolute difference according to a noise of the image capturing device under a plurality of light settings, wherein each of the light settings respectively corresponds to a set of first sum of absolute difference;
   capturing a first frame and a second frame via the image capturing device under a picturing light setting of the light settings;
   calculating a plurality of second sum of absolute difference between the first frame and the second frame;
   finding a plurality of object block within a vein tracking of the object in the first frame and the second frame;
   calculating a local motion vector of each object block respectively according to the second sum of absolute difference;
   calculating a first reliability of each object block respectively according to the second sum of absolute difference and the set of first sum of absolute difference corresponding to the picturing light setting; and
   estimating the local motion vectors according to the first reliability to obtain a global motion vector.

2. The method for analyzing object motion in multi frames adapted to an image capturing device as claimed in claim 1, wherein the step of obtaining the sets of first sum of absolute difference according to the noise of the image capturing device under the light settings comprises:
   capturing a plurality of images to a light box via the image capturing device under the light settings respectively; and
   calculating and recording the first sum of absolute difference of the images in different locations.

3. The method for analyzing object motion in multi frames adapted to an image capturing device as claimed in claim 2, wherein the step of calculating and recording the first sum of absolute difference of the images in different locations comprises:
   recording the first sum of absolute difference of four corner pixels of each block of the images so as to interpolate the first sum of absolute difference of pixels of each block via the first sum of absolute difference of the four corner pixels.

4. The method for analyzing object motion in multi frames adapted to an image capturing device as claimed in claim 2, wherein the step of calculating and recording the first sum of absolute difference of the images in different locations comprises:
   recording the first sum of absolute difference shared by the pixels in each block of the images.

5. The method for analyzing object motion in multi frames adapted to an image capturing device as claimed in claim 2, wherein the light source settings comprises:
   at least one of brightness of the light box, color and photo sensitivity of the image capturing device and limb darkening.

6. The method for analyzing object motion in multi frames adapted to an image capturing device as claimed in claim 1, wherein the step of finding the object blocks comprises:
   calculating a maximum sum of absolute difference and a minimum sum of absolute difference of each block between the first frame and the second frame; and
   determining whether each block is among one of the object blocks or a background block according to the difference between the maximum sum of absolute difference and the minimum sum of absolute difference of each block.

7. The method for analyzing object motion in multi frames adapted to an image capturing device as claimed in claim 6, wherein the step of estimating the local motion vectors according to the first reliability to obtain the global motion vector comprises:
   calculating a second reliability of the object blocks respectively according to the difference between the maximum sum of absolute difference and the minimum sum of absolute difference of each block; and
   estimating the local motion vectors according to the first reliability and the second reliability to obtain the global motion vector.

8. The method for analyzing object motion in multi frames adapted to an image capturing device as claimed in claim 7, wherein the step of estimating the local motion vectors according to the first reliability and the second reliability to obtain the global motion vector comprises:
  calculating a plurality of average reliability according to the first reliability and the second reliability; and
  weighting the local motion vectors according to the average reliability to obtain the global motion vector.

9. The method for analyzing object motion in multi frames adapted to an image capturing device as claimed in claim 1, wherein the step of calculating the first reliability of each object block respectively according to the second sum of absolute difference and the set of first sum of absolute difference corresponding to the picturing light setting comprises:
  calculating a standard deviation tolerance of the set of first sum of absolute difference;
  calculating a ratio of the second sum of absolute difference to the set of first sum of absolute difference; and
  comparing the ratio and the standard deviation tolerance to obtain the first reliability.

* * * * *